United States Patent [19]

Tesch

[11] Patent Number: 5,444,959
[45] Date of Patent: Aug. 29, 1995

[54] THREE-DIMENSIONAL STRUCTURAL COMPONENT

[76] Inventor: Gunter Tesch, Avenue Jean-Marie-Musy 15, CH-1700 Fribourg, Switzerland

[21] Appl. No.: 191,754

[22] Filed: Feb. 4, 1994

Related U.S. Application Data

[63] Continuation of Ser. No. 663,822, filed as PCT/EP90/01110, Jul. 9, 1990, abandoned.

[30] Foreign Application Priority Data

Jul. 31, 1989 [CH] Switzerland .................. 02842/89

[51] Int. Cl.$^6$ .................. B32B 3/28; B29D 7/00; E04C 2/24
[52] U.S. Cl. .................. 52/794.1; 52/783.11; 428/136; 156/84
[58] Field of Search .................. 52/794, 799, 801, 806, 52/808; 156/84, 85; 264/56, 342 R, DIG. 71; 428/136, 174, 178

[56] References Cited

U.S. PATENT DOCUMENTS

| | | | |
|---|---|---|---|
| 3,195,686 | 7/1965 | Johnson | 52/808 X |
| 3,231,454 | 1/1966 | Williams | 428/174 X |
| 3,294,387 | 12/1966 | Chauannes | 428/178 X |
| 3,790,652 | 2/1974 | Colijn et al. | 264/146 |
| 3,812,001 | 5/1974 | Ryan | 428/178 |
| 3,908,052 | 9/1975 | Sanders | 428/178 X |
| 4,118,261 | 10/1978 | Pedler | 428/178 X |
| 4,495,237 | 1/1985 | Patterson | 428/178 |
| 4,536,440 | 8/1985 | Berg | 428/284 |
| 4,709,781 | 12/1987 | Scherzer | 181/290 |
| 4,840,515 | 6/1989 | Freese | 428/178 X |
| 4,889,758 | 12/1989 | Rinkewich | 428/178 |
| 5,158,821 | 10/1992 | Gebauer et al. | 428/174 |
| 5,196,254 | 3/1993 | Akiyama | 428/178 |

FOREIGN PATENT DOCUMENTS

| | | |
|---|---|---|
| 0250005 | 3/1985 | European Pat. Off. . |
| 3020595 | 12/1980 | Germany . |
| 3729633 | 3/1989 | Germany . |

*Primary Examiner*—Carl D. Friedman
*Assistant Examiner*—Robert J. Canfield
*Attorney, Agent, or Firm*—Bacon & Thomas

[57] ABSTRACT

A three-dimensional grid includes a planar base portion and a plurality of protrusions. The protrusions are spaced about and project substantially perpendicular from the base portion. The projections are convexly curved and are integrally formed with the base portion by slitting and shrinking a single sheet of plastic. Additional layers of materials may be alternatively attached to either or both of the planar base portion and protrusions.

12 Claims, 4 Drawing Sheets

THREE-DIMENSIONAL STRUCTURAL COMPONENT

This application is a continuation of application Ser. No. 07/663,822, filed as PCT/EP90/01110, Jul. 9, 1990, abandoned.

BACKGROUND OF THE INVENTION

The invention concerns a three-dimensional structure which comprises a planar base and convex curvatures such as cups, bridges or the like which protrude from the planar base in a perpendicular direction.

The expression "three-dimensional structure" denotes a structure which may be, for example, similar to an egg carton in design.

A three-dimensional structural component is known from the German patent document A 3,792,633 which is made by deep-drawing of at least one layer of a knit and a fiber mat which has been impregnated with synthetic resin. Such three-dimensional structural components, termed therein as "structural honeycombs", are especially well suited as core materials for making planar sandwich bodies.

As a rule such structural components may be used as spacers, being lightweight and comparatively stable and mechanically strong.

This known structural component is manufactured by placing a fiber mat consisting of a web or of individual staple fibers arrayed in planar manner on a length of knit material, the fiber mat possibly being covered by yet another length of knit material and, following impregnation with a synthetic resin or a corresponding solution or emulsion, the combined lengths are then subjected to deep-drawing and simultaneous heating.

The known structural component becomes rigid only after the synthetic resin has cured. Using one or more layers of knit material and incorporating synthetic resins makes the product fairly expensive.

During the deep-drawing of the lengths of knits, the threads of these knits usually retain their initial length but may be shifted relative to each other. According to German patent A 3,792,633, the known structural components may contain in excess of 50% by weight synthetic resins, for instance phenol-formaldehyde-resol resins, whereas the knits only amount to less than 25% by weight of the product. Accordingly such a product entails ecological problems both during manufacture and during its later destruction.

SUMMARY OF THE INVENTION

The object of the invention is to create a structural component as described above which is more economical in its manufacture while being at least equally strong.

This problem is solved by providing, in general, a three-dimensional structure which comprises a planar base and convex curvatures such as cups, bridges or the like which protrude from the planar base of the structure in a perpendicular direction, wherein the structure is a plastic grid.

DETAILED DESCRIPTION OF THE PREFERRED EMBODIMENT

Figure 1:
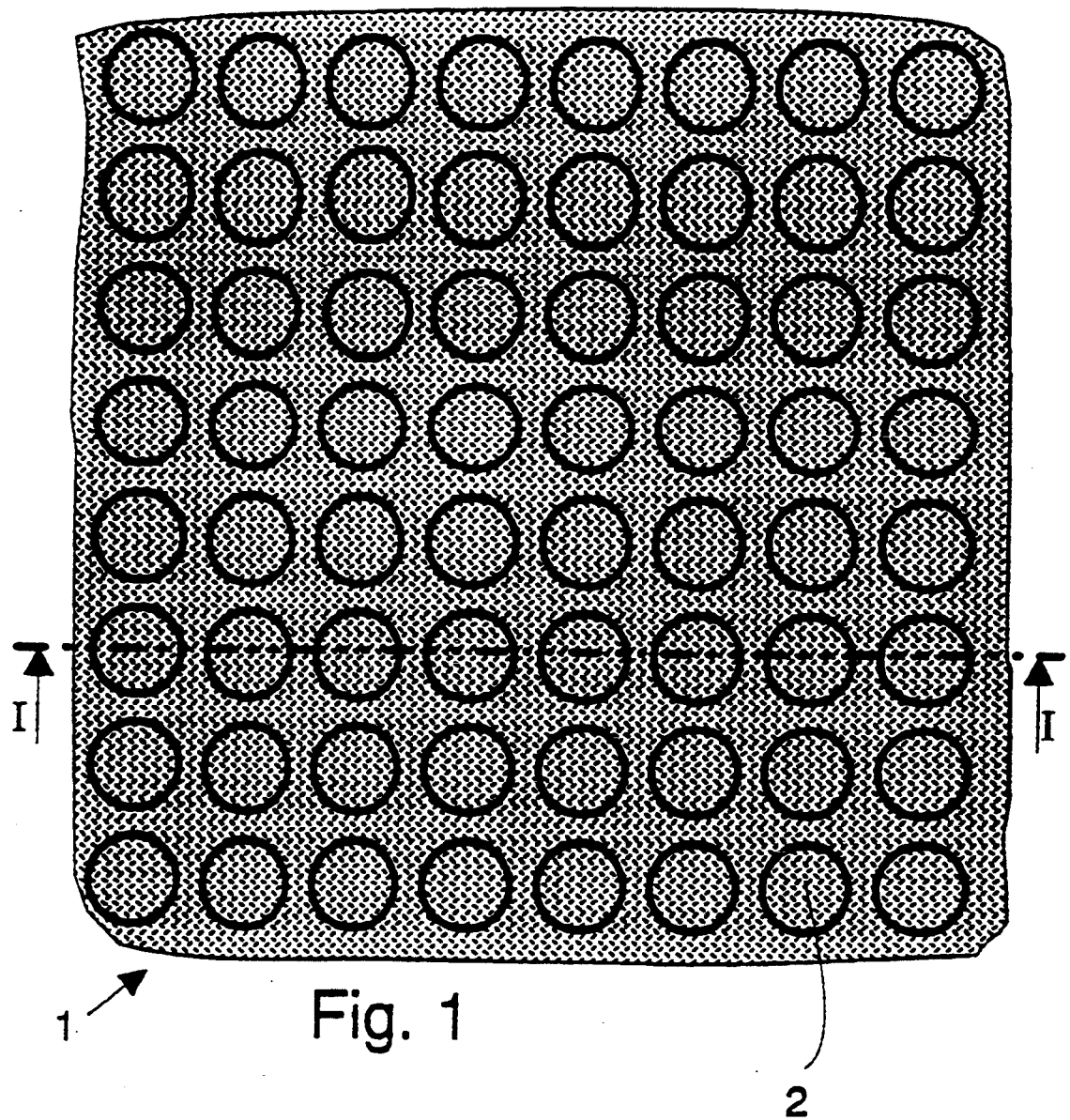
FIG. 1 is a top view of the structure of the invention.
Figure 2:
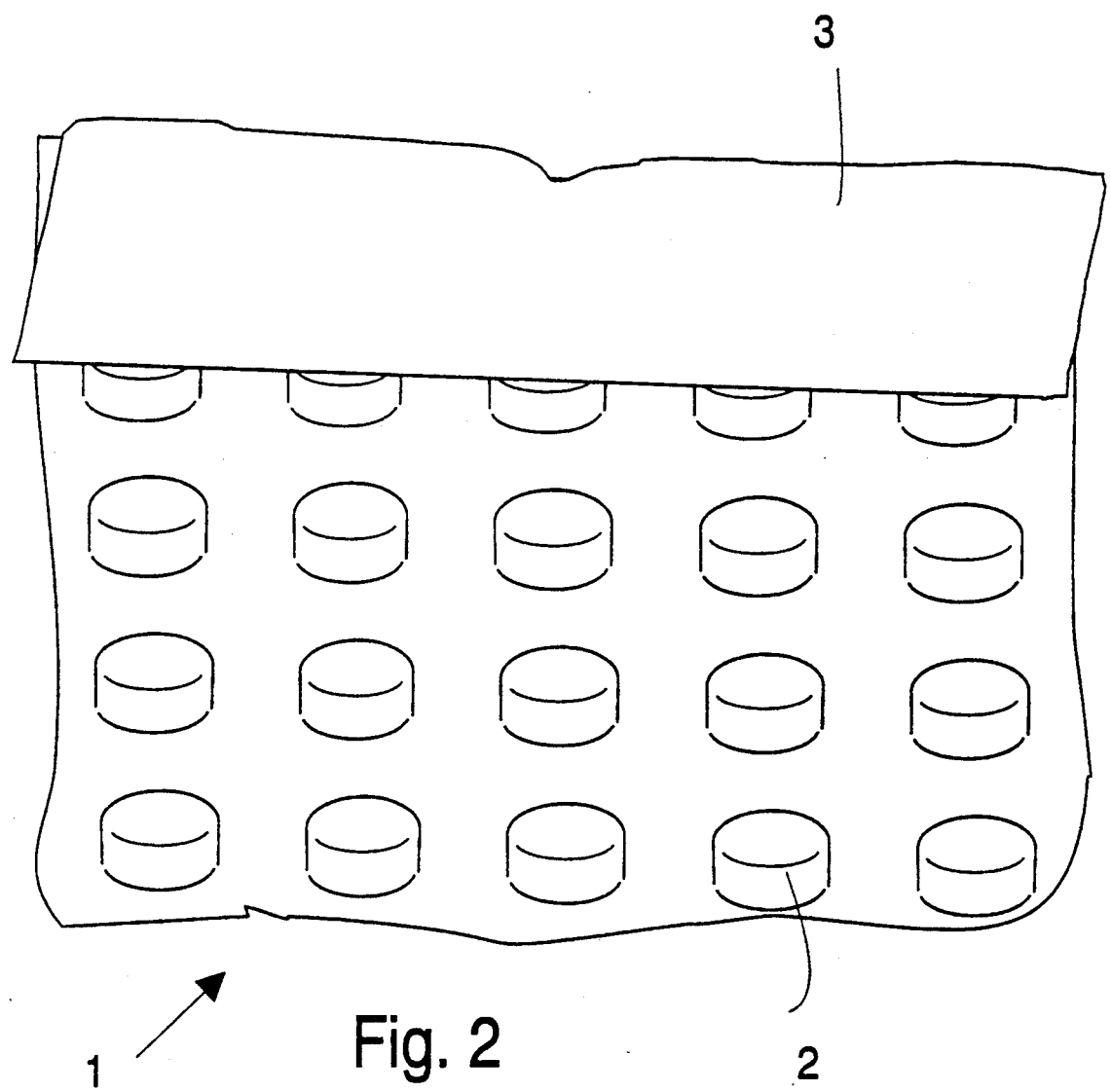
FIG. 2 is a perspective view of the structure of the invention having a top layer.
Figure 3:
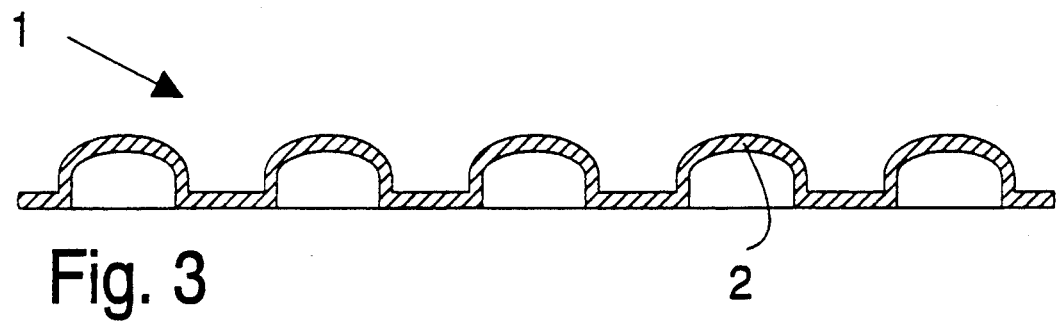
FIG. 3 is a cross-sectional view of the structure of the invention at line I—I of FIG. 1 wherein the structure is a grid having convexly curved cups only.
Figure 4:
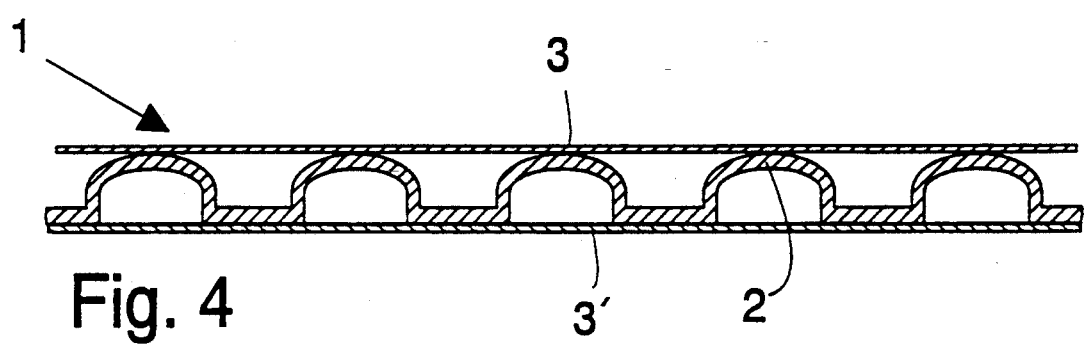
FIG. 4 is a cross-sectional view of the structure of the invention similar to that of FIG. 3 but wherein the structure is a grid having convexly curved cups with top and bottom layers.
Figure 5:
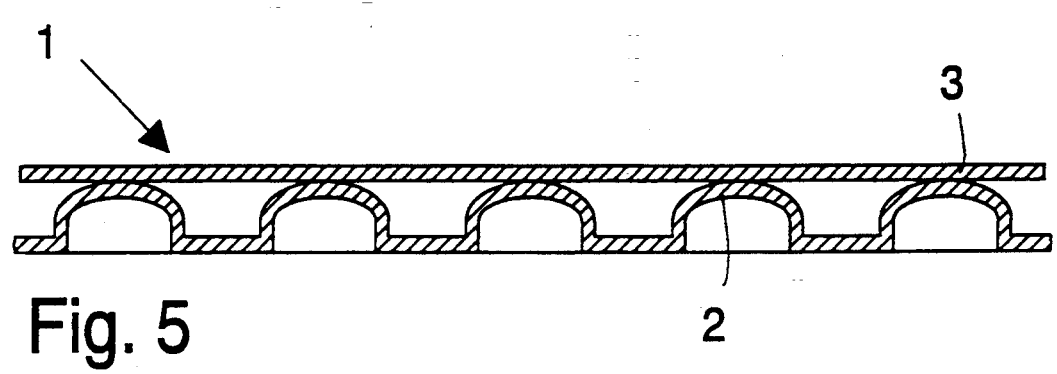
FIG. 5 is a cross-sectional view of the structure of the invention shown in FIG. 2 wherein the structure is a grid having cups and a single layer on top of the grid.
Figure 6:
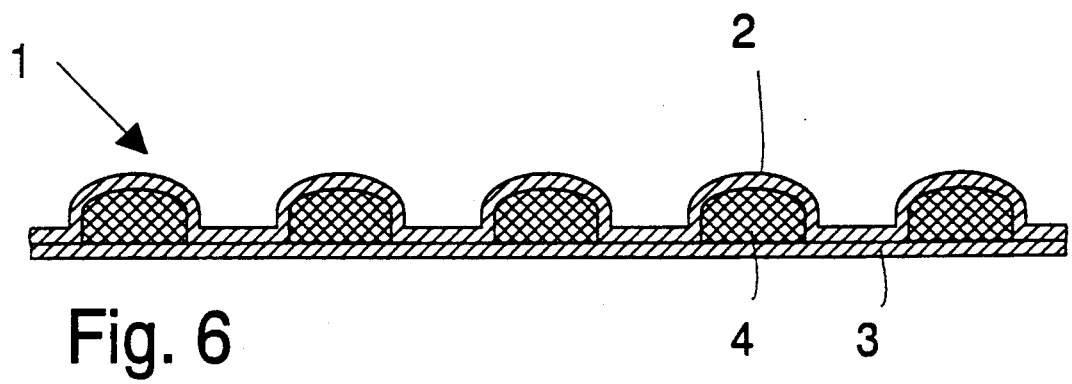
FIG. 6 is a cross-sectional view of the structure of the invention wherein the structure is a grid having cups which are filled with a further material.
Figure 7:
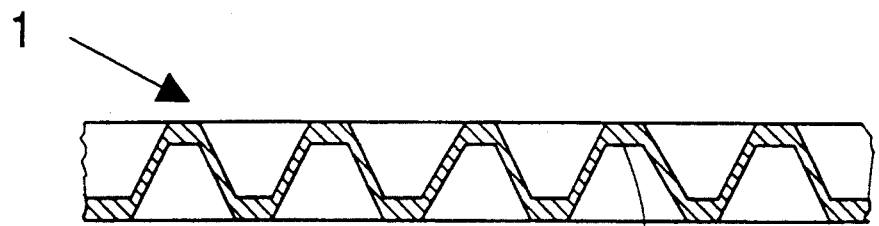
FIG. 7 is a cross-sectional view of the structure of the invention similar to that shown in FIG. 3 but with sharply, convexly curved or egg carton shaped cups.
Figure 8:
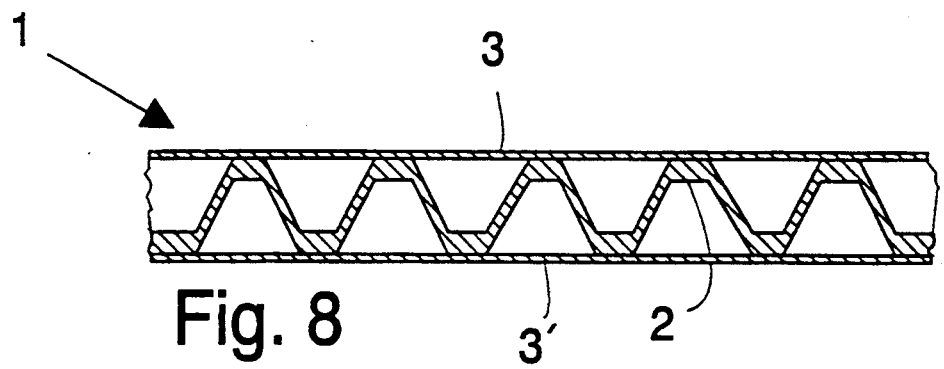
FIG. 8 is a cross-sectional view of the structure of the invention similar to that shown in FIG. 4 but with sharply, convexly curved or egg carton shaped cups.
Figure 9:
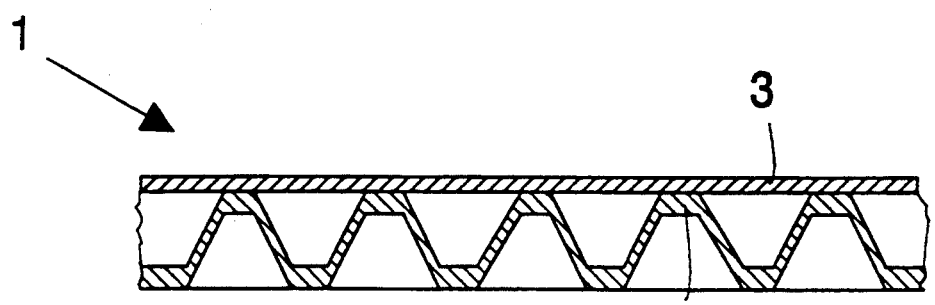
FIG. 9 is a cross-sectional view of the structure of the invention similar to that shown in FIG. 5 but with sharply, convexly curved or egg carton shaped cups.
Figure 10:
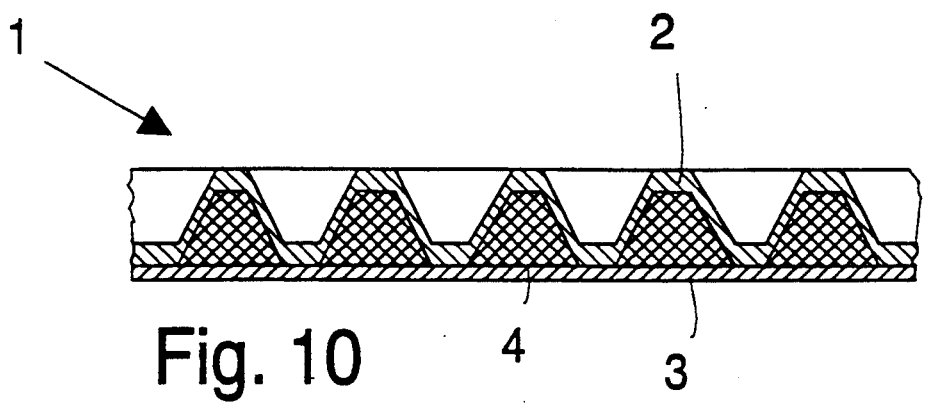
FIG. 10 is a cross-sectional view of the structure of the invention similar to that shown in FIG. 6 but with sharply, convexly curved or egg carton shaped cups.

FIG. 1 shows the structure (1) of the invention having cups (2) and the net-like pattern of small slits. FIG. 2 shows the structure (1) having a top layer (3). FIG. 3 shows the structure (1) having cups (2) only. FIG. 4 shows the structure (1) of FIG. 3 having upper and lower layers (3,3′) of a web, preferably a non-woven web of superposed crossing threads not tied to each other, or the like, laid atop each grid. FIG. 5 shows the structure (1) with cups (2) and a single layer (3) of another material atop the grid. FIG. 6 shows the structure (1) having cups (2) which are filled with a further material (4). FIGS. 7–10 generally correspond to FIGS. 3–6 respectively but depict the cups as sharply, convexly curved or egg carton shaped.

The plastic grid used in the invention can be manufactured from a shrinkable slit sheet. The sheet is slit and then shrunk while the slits are being opened. Such a sheet is described for example in German patent document C 1,199,876. This sheet may be an adhesive sheet.

The structure of the invention may be composed of two plastic grids, preferably of different materials, designs or the like. However, it can also be composed of at least one layer of a plastic grid and one layer of a web, such as a non-woven fiber web including superposed crossing threads not tied to each other, a foamed sheet, an open-pore foam or a slitted aluminum foil. The additional layers may be bonded or welded to the plastic grid, making use of its adhesiveness or fusion.

Where at least two slitted plastic sheets are used, the slits may be perpendicular to one another in both sheets. They may also be two prefabricated plastic grids transverse to each other.

Alternatively, the structure of the invention may consist of three layers, wherein the central layer is a plastic grid and the other two layers consist of one or two materials listed above, or wherein the two outer layers each are a plastic grid and the central layer is another material selected from the materials listed above.

The design in each case depends on the desired use of the structure of the invention.

In an advantageous embodiment, a further planar layer is mounted on the convex curvatures protruding from one side of the structure. A cavity or a multitude of cavities is thus created between this further planar layer and the convex curvatures. The convex curvatures are either empty or may be filled with some material.

If the structure is to be additionally reinforced, then this may be achieved by absorbing into it a cured material which may be, for instance, epoxy resin or the like.

Polyolefins are used as the material for the plastic grid. This material may be a polyamide, polypropylene, polyethylene, polyester or a combination of these. These materials lend themselves especially well to shrinking into a grid.

The apertures of the grid may be filled with a further material such that the structure of the invention is not only reinforced but also, depending on the material, is rendered impermeable to solids, liquids and/or gases.

For such a purpose, the material filling the grid apertures advantageously shall contain a binder.

The convex curvatures of the structure may be filled by means of another material such as set gypsum, cement, concrete or wood fiber slurry.

The manufacture of the structure of the invention may be carried out as hereinafter described.

A shrinkable plastic sheet which may be bonded to one or more layers of another material is slitted and the slits are arrayed for instance in rows, and the slits of adjacent rows may be mutually staggered (also see German patent document C 1,919,876). This slitted length of material is subjected to shrinkage such that the slits of the plastic sheet open into a grid structure. Prior to, or also after cooling, the length of material is deep-drawn into the desired shape.

When the structure is being deep-drawn, at least the plastic grid is partly stretched. As a result the molecular structure in the grid is altered. Deep-drawing can be carried out cold or with heat treatment.

I claim:

1. A three-dimensional grid comprising:
   a planar base portion; and
   a plurality of protrusions being spaced about and projecting substantially perpendicular from said base portion, each of said protrusions being convexly curved, said planar base portion and said plurality of protrusions being integrally formed of a single slitted and shrunken sheet of plastic.

2. A three-dimensional grid as claimed in claim 1, further comprising a layer of material extending across and secured to said plurality of protrusions.

3. A three-dimensional grid as claimed in claim 2, wherein said layer of material is selected from the group consisting of a web, a foamed foil and slitted aluminum.

4. A three-dimensional grid as claimed in claim 2, further comprising an additional layer of material extending across and secured to a side of said planar base portion opposite said plurality of protrusions wherein said planar base portion and said plurality of protrusions are sandwiched between said layer of material and said additional layer of material.

5. A three-dimensional grid as claimed in claim 1, further comprising a layer of material extending across and secured to a side of said planar base portion opposite said plurality of protrusions.

6. A three-dimensional grid as claimed in claim 5, wherein said layer of material is selected from the group consisting of a web, a foamed foil and slitted aluminum.

7. A three-dimensional grid as claimed in claim 5, further comprising a filler material placed in said plurality of protrusions between said protrusions and said layer of material.

8. A three-dimensional grid as claimed in claim 7, wherein said filler material is selected from the group consisting of set gypsum, cement, concrete and wood fiber slurry.

9. A three-dimensional grid as claimed in claim 1, wherein said grid has an associated surface that is slitted throughout.

10. A three-dimensional grid as claimed in claim 9, further comprising a reinforcing material which is upon the slitted surface of the grid and cured to enhance the structural rigidity of said grid.

11. A three-dimensional grid as claimed in claim 10, wherein said reinforcing material is an epoxy resin.

12. A three-dimensional grid as claimed in claim 1, wherein the single sheet of plastic that forms said grid comprises a polyolefin.

* * * * *